Dec. 23, 1941.   D. SCHWARTZ ET AL   2,267,342
METHOD OF MAKING COMPOSITE STRIP
Filed April 7, 1939
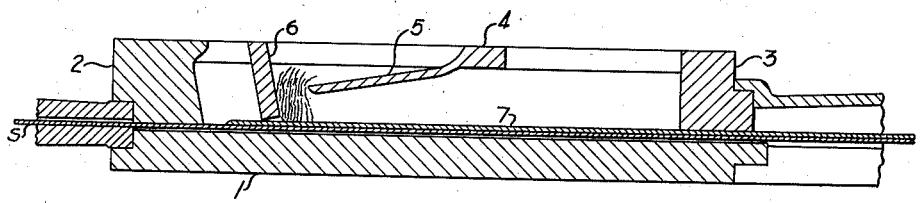
*Fig.1*
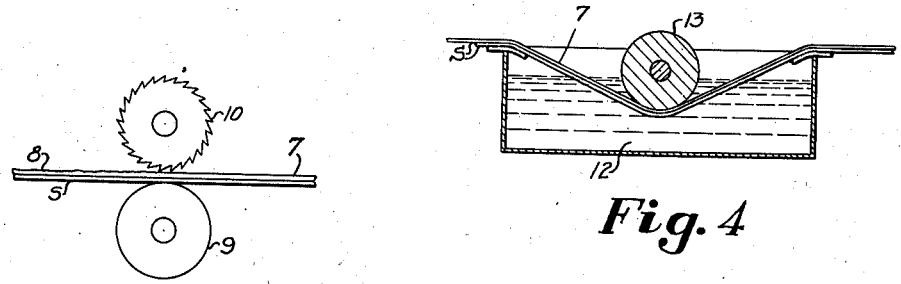
*Fig.2*          *Fig.4*
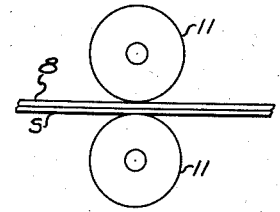
*Fig.3*
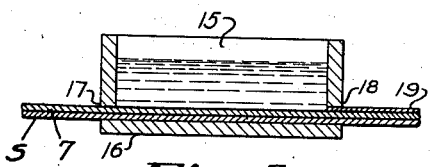
*Fig.5*
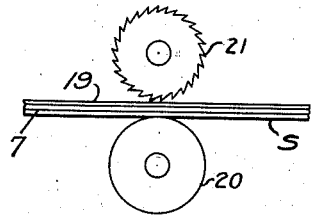
*Fig.6*
INVENTOR.
DONALD SCHWARTZ
JOHN K. ANTHONY
JOHN V. O. PALM
BY
Horace B. Fay
ATTORNEY.

Patented Dec. 23, 1941

2,267,342

UNITED STATES PATENT OFFICE 2,267,342

METHOD OF MAKING COMPOSITE STRIP

Donald Schwartz, John K. Anthony, and John V. O. Palm, Cleveland Heights, Ohio, assignors to The Cleveland Graphite Bronze Company, Cleveland, Ohio, a corporation of Ohio Application April 7, 1939, Serial No. 266,624

4 Claims. (Cl. 29—189)

This invention relates, as indicated, to methods of making composite strip, but has reference more particularly to methods of making strip of this character which is suitable for manufacture into bearings consisting of three different metals, such, for example, as disclosed in the co-pending application of John V. O. Palm, Serial No. 247,235.

The bearing, as disclosed in the aforesaid application, consists of a backing or supporting layer of steel or similar material, an intermediate layer of a copper base alloy and a surface layer of a white metal alloy.

A primary object of the invention is the provision of a method which will produce bearings of the aforesaid character, having more uniform physical, chemical and metallurgical properties and longer life in actual use than like bearings produced by methods employed to make individual bearings.

Another object of the invention is to provide a method of producing bearings of the aforesaid character, with the production of less scrap than has characterized such former methods.

A further object of the invention is to provide a method which will result in bearings of the character described, which are virtually devoid of porosity and in which dendrites are vitually eliminated from the intermediate metal layer by the operations to which the composite strip has been subjected.

A still further object of the invention is to provide a method for the economical production of bearings of the aforesaid character, having a substantial amount of lead in the intermediate layer, but which at the same time is substantially free from lead in the Babbitt layer, even when the intermediate layer is tinned with a high lead solder. Such a result has been difficult, if not impossible, of attainment with any reasonable degree of economy.

To the accomplishment of the foregoing and related ends, said invention, then, consists of the steps hereinafter described and particularly pointed out in the claims; the annexed drawing and the following description setting forth in detail one approved method of carrying out the invention, such disclosed steps illustrating, however, but one of the various ways in which the principle of the invention may be used.

In said annexed drawing:

Fig. 1 is a longitudinal cross-sectional view showing the first step in the manufacture of the composite strip used for making bearings of the character described;

Fig. 2 is a view illustrating the second step in the method of making the composite strip;

Fig. 3 is a view illustrating the third step in the manufacture of the composite strip; and Figs. 4, 5 and 6 illustrate the fourth, fifth and sixth steps in the manufacture of the composite strip.

Referring more particularly to the drawing, the strip S is first passed through a pouring box, which comprises a center guide shoe or base plate 1 having side walls connected at one end by a back wall 2 and at the other end by a front wall or bridging piece 3, and upon which is mounted a pan 4, having a transversely curved bottom 5 which slopes rearwardly and downwardly when considered with reference to the direction of movement of the strip. The box is further provided with an end wall or spreader plate 6 which is disposed at an acute angle to the strip as the latter moves through the box, and extends crosswise of the space between the inner surfaces of the side walls of the box, the bottom 5 of the pan 4 terminating short of such spreader plate, so as to leave a space through which the molten metal, in this case, a copper base alloy, flows onto the strip. The pouring box may, if desired, be inclined, as disclosed in the application of George Edwards, Serial No. 246,127.

The copper base alloy, which flows onto the strip, may be any one of the numerous alloys disclosed in the aforesaid Edwards application, but is preferably a copper-lead alloy, familiarly known as plastic bronze, and the strip S emerges from the box with a coating 7, of such alloy formed thereon, the coating being cooled and solidified in any desired manner, as for example, by means of water sprays or air.

The coating 7 of the strip as the strip thus emerges from the pouring box, is not uniform in thickness, and its upper surface, as indicated by reference numeral 8, is rough. In order to eliminate this roughness, render the surface clean and smooth, as well as to reduce the coating to substantially the desired thickness, the strip, suitably suspended, is run over a supporting roll 9, and beneath a milling roll or cutter 10, the latter removing a sufficient amount of the copper base alloy coating 7 to leave such coating of substantially the desired thickness and with a clean surface, as required for the next operation.

The bimetallic strip, thus prepared, may be rolled, as shown in Fig. 3, between a pair of pressure rolls 11 to strain the metal so that when subsequently annealed, it has a uniform equiaxed grain structure, free from mechanical strains, hard spots and other imperfections which might be inherent in cast structures. Another object of this treatment is to eliminate porosity when present. After the anneal, the strip may be sent back to be finish milled to size or subjected directly to the tinning operation to be presently described.

The bimetallic strip, thus prepared, is next subjected to a tinning operation, whereby the clean surface of the copper base alloy coating is preserved, and better bonding of the white metal coating therewith is assured. For this purpose, the strip is passed through a bath 12 of molten tin or solder. A roller 13 leads the strip under the surface of the bath, and after the strip emerges from the bath, it has a coating of tin or solder 14 bonded to its surface.

Following such tinning operation, the strip is passed into a bath of molten white metal, such, for example, as Babbitt metal, which is confined within a chamber or pouring box 15. The chamber 15 is provided with imperforate sides and an imperforate bottom 16, but with an opening 17 at one end designed to permit the bimetallic tinned strip to pass therethrough, and with a second opening 18 at the exit end through which such strip and molten Babbitt are drawn out of the bath. The molten Babbitt is supplied to the bath in an amount proportionate to the amount which is withdrawn in the form of a coating 19 on the strip. This coating is solidified, as by flooding the lower side of the strip with a cooling liquid, such as water.

The coating of the Babbitt metal, which is provided on the strip, is approximately .030" thick, but, as disclosed in the Palm application, to which reference has been made, it is desired, in order to secure a satisfactory life in the white metal or Babbitt layer of a bearing made from the strip, that the thickness of such layer should not exceed .0075 of an inch. We accordingly run the strip, suitably tensioned, over a supporting roll 20, and beneath a milling roll or cutter 21, the latter removing a sufficient amount of the Babbitt metal to leave a coating of approximately .010 of an inch in thickness.

Composite strip made in the aforesaid manner has been found to be admirably adapted for manufacture into tri-metal bearings of the character described. Such bearings are characterized by uniform physical, chemical and metallurgical properties and have a long life in actual use.

Other modes of applying the principle of our invention may be employed instead of the one explained, change being made as regards the means and steps herein disclosed, provided those stated by any of the following claims or their equivalent be employed.

We therefore particularly point out and distinctly claim as our invention:

1. The method of making composite metal strip which comprises coating steel strip with a copper base alloy, removing a portion of said alloy coating, rolling and annealing to refine the grain structure, and then coating said alloy coating with Babbitt metal.

2. The method of making composite metal strip which comprises coating steel strip with a copper base alloy, milling said coating to remove a portion thereof and reduce the thickness to desired limits, rolling and annealing to refine the grain structure, tinning said coating, and then applying a coating of Babbitt metal over said tin coating.

3. The method of making composite metal strip which comprises coating steel strip with a copper base alloy, milling said coating to remove a portion thereof and reduce the thickness to desired limits, rolling and annealing to refine the grain structure, applying a coating of Babbitt metal over said alloy coating, and removing a portion of said Babbitt metal coating.

4. The method of making composite metal strip which comprises coating steel strip with a copper base alloy, removing a portion of said alloy coating to reduce the thickness thereof to desired limits, rolling said coating to strain the same, so that when it is subsequently annealed, it has a uniform equiaxed grain structure, free from mechanical strains, hard spots and other imperfections, and is non-porous, annealing the coating, applying a coating of Babbitt metal over said alloy coating and removing a portion of said Babbitt metal coating.

DONALD SCHWARTZ.
JOHN K. ANTHONY.
JOHN V. O. PALM.